United States Patent
Nguyen et al.

(10) Patent No.: US 7,036,592 B2
(45) Date of Patent: *May 2, 2006

(54) HIGH STRENGTH PARTICLES AND METHODS OF THEIR USE IN SUBTERRANEAN OPERATIONS

(75) Inventors: Philip D. Nguyen, Duncan, OK (US); David L. Lord, Marlow, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/916,280

(22) Filed: Aug. 11, 2004

(65) Prior Publication Data

US 2005/0016726 A1    Jan. 27, 2005

Related U.S. Application Data

(63) Continuation-in-part of application No. 10/443,532, filed on May 22, 2003, now Pat. No. 6,983,797, and a continuation-in-part of application No. 10/859,008, filed on Jun. 2, 2004.

(51) Int. Cl.
  *E21B 43/04*  (2006.01)
(52) U.S. Cl. .................... 166/280.2; 166/278
(58) Field of Classification Search ............ 166/280.2, 166/278
  See application file for complete search history.

(56) References Cited

U.S. PATENT DOCUMENTS

| | | | |
|---|---|---|---|
| 34,371 A | 2/1862 | Mason ................ 501/128 |
| 4,440,866 A | 4/1984 | Lunghofer et al. ....... 510/127 |
| 4,493,875 A | 1/1985 | Beck et al. ............. 428/403 |
| 4,713,203 A * | 12/1987 | Andrews .............. 166/280.2 |
| 4,879,181 A | 11/1989 | Fitzgibbon ............. 428/402 |
| 4,921,820 A | 5/1990 | Rumpf et al. .......... 501/128 |
| 4,921,821 A | 5/1990 | Rumpf et al. .......... 501/128 |
| 4,997,116 A | 3/1991 | Grim .................. 224/42.03 |
| 5,030,603 A | 7/1991 | Rumpf et al. .......... 501/127 |
| 5,120,455 A | 6/1992 | Lunghofer ............ 252/8.551 |
| 5,188,175 A | 2/1993 | Sweet ................... 166/280 |
| 5,443,603 A | 8/1995 | Kirkendall ............. 51/296 |
| 6,372,678 B1 * | 4/2002 | Youngman et al. ...... 166/280.1 |
| 6,406,789 B1 | 6/2002 | McDaniel et al. ........ 428/402 |
| 6,544,934 B1 | 4/2003 | Taylor et al. ........... 507/238 |
| 2002/0048676 A1 | 4/2002 | McDaniel et al. ........ 428/404 |
| 2002/0058581 A1 | 5/2002 | Youngman et al. ....... 501/155 |
| 2002/0121374 A1 * | 9/2002 | Ranson et al. .......... 166/302 |
| 2002/0132875 A1 | 9/2002 | Stadtmeuller .......... 523/115 |
| 2002/0143094 A1 | 10/2002 | Conroy et al. ......... 524/445 |
| 2003/0099798 A1 | 5/2003 | George et al. .......... 428/36.9 |

FOREIGN PATENT DOCUMENTS

| | | |
|---|---|---|
| EP | 0 101 855 A1 | 3/1984 |
| WO | WO 03/027431 A2 | 4/2003 |

OTHER PUBLICATIONS

J. Gorman, Science News This Week, Fracture Protection—Nanotubes toughen up ceramics. www.sciencenews.com, vol. 163, p. 3, Jan. 4, 2003.

Zhan et al., UC Davis Department of Chemical Engineering, "Single-wall carbon nanotubes as attractive toughening agents in alumina-based nanocomposites," published on-line Dec. 15, 2002.

Foreign communication from a related counterpart application dated Aug. 30, 2004.

* cited by examiner

*Primary Examiner*—John Kreck
(74) *Attorney, Agent, or Firm*—Robert A. Kent; Baker Botts

(57) ABSTRACT

The present invention relates to composite particulates comprising a base material and a nanoparticle material. One embodiment of the present invention provides a method of using a sintered composite particulate in a subterranean application comprising providing a slurry comprising a sintered composite particulate comprising a base material and at least one nanoparticle material; and placing the slurry into a well bore penetrating a subterranean formation. Another embodiment of the present invention provides sintered composite particulates useful in completing and stimulating wells comprising a base material and nanoparticle material wherein the composite particulate comprises from about 0.1% to about 30% nanoparticle material by weight of the composite particulate and wherein the composite particulates are sintered

50 Claims, No Drawings

HIGH STRENGTH PARTICLES AND METHODS OF THEIR USE IN SUBTERRANEAN OPERATIONS

CROSS REFERENCE TO RELATED APPLICATIONS

This application is a continuation-in-part of U.S. application Ser. No. 10/443,532, filed on May 22, 2003 now U.S. Pat. No. 6,983,797 and of U.S. application Ser. No. 10/859,008, filed on Jun. 2, 2004.

BACKGROUND OF THE INVENTION

The present invention relates to compositions suitable for use as particulates in subterranean operations, such as proppant or gravel. More particularly, the present invention relates to composite particulates comprising a base material and a nanoparticle material.

Particulates are used in a variety of operations and treatments performed in oil and gas wells. Such operations and treatments include, but are not limited to, production stimulation operations such as fracturing, well completion operations such as gravel packing, and combined operations such as frac-packing.

An example of a production stimulation operation using a servicing fluid having particles suspended therein is hydraulic fracturing, wherein a servicing fluid known as a fracturing fluid is pumped through a well bore into a portion of a subterranean formation at a rate and pressure such that fractures are formed and/or enhanced into the subterranean zone. The fracture or fractures may range from horizontal to vertical, with the latter usually predominating, and with the tendency toward vertical fracture orientation with the depth of the formation being fractured. A suitable fracturing fluid is generally a viscosified treatment fluid, emulsion, or foam that may comprise a particulate material often referred to as proppant. Proppant may be deposited in a fracture and function, inter alia, to hold the fracture open while maintaining conductive channels through which produced fluids can flow upon completion of the fracturing treatment and release of the attendant hydraulic pressure.

An example of a well completion operation using a servicing fluid containing particulates is gravel packing. Gravel packing treatments are used, inter alia, to reduce the migration of unconsolidated formation particulates into the well bore. In gravel packing operations, particles referred to in the art as gravel are carried to a well bore in a portion of a subterranean formation by a hydrocarbon or water-based carrier fluid. That is, the particulates are suspended in a carrier fluid, which may be viscosified, and the carrier fluid is pumped into a well bore in which the gravel pack is to be placed. As the particulates are placed in the zone, the carrier fluid leaks off into the subterranean zone and/or may be returned to the surface after passing through a screen positioned adjacent to the productive interval. The resultant gravel pack acts as a filter to separate formation solids from produced fluids while permitting the produced fluids to flow into and through the well bore. Traditional gravel pack operations involve placing a gravel pack screen in the well bore and packing the surrounding annulus between the screen and the well bore with gravel sized to prevent the passage of formation particulates through the pack with produced fluids. The gravel pack screen is generally a filter assembly used to support and retain the gravel placed during the gravel pack operation. A wide range of sizes and screen configurations are available to suit the characteristics of a well bore, the production fluid, and any particulates in the subterranean formation. Gravel packs may be used to stabilize a portion of a formation while causing minimal impairment to well productivity. The gravel, inter alia, acts to prevent the particulates from occluding the screen or migrating with the produced fluids, and the screen, inter alia, acts to prevent the gravel from entering the well bore.

In some situations the processes of hydraulic fracturing and gravel packing are combined into a single treatment to provide a stimulated production and an annular gravel pack to prevent formation sand production. Such treatments are often referred to as "frac pack" operations. These treatments are often completed with a gravel pack screen assembly in place with the hydraulic fracturing treatment being pumped through the annular space between the casing/open hole and screen. In this situation the hydraulic fracturing treatment is typically designed to screen out at the fracture tip, creating a packed fracture and an annular gravel pack between the screen and casing/open hole. This allows both the hydraulic fracturing treatment and gravel pack to be placed in a single operation. In other cases the fracturing treatment may be performed prior to installing the screen and placing a gravel pack.

Servicing fluids such as fracturing fluids, gravel packing carrier fluids, and frac pack fluids, generally must be highly viscous to be able to adequately suspend particulates so as to be able to place them in a desired location. To achieve a high viscosity, viscosifiers often are added to such fluids. Such viscosifiers are often expensive. Moreover, as a fracture or a gravel pack is created a portion of the liquid contained in the fluid may leak off into the formation and create a filter cake comprising deposited viscosifier on the walls of the fracture, well bore, and/or the formation, which may be undesirable.

The particulates used in subterranean application should have a high enough strength to withstand various forces within the formation, yet they should be relatively lightweight so that a servicing fluids used to carry them may need a reduced amount of viscosifier.

SUMMARY OF THE INVENTION

The present invention relates to compositions suitable for use as particulates in subterranean operations, such as proppant or gravel. More particularly, the present invention relates to composite particulates comprising a base material and a nanoparticle material.

One embodiment of the present invention provides a method of using a sintered composite particulate in a subterranean application comprising providing a slurry comprising a sintered composite particulate comprising a base material and at least one nanoparticle material; and placing the slurry into a well bore penetrating a subterranean formation.

Another embodiment of the present invention provides a method of fracturing a portion of a subterranean formation having at least one fracture therein comprising providing a fracturing fluid comprising a sintered composite particulate comprising a base material and at least one nanoparticle material; and placing the fracturing fluid into a well bore penetrating the portion of the subterranean such that at least a portion of the sintered composite particulate s enter at least one fracture therein.

Another embodiment of the present invention provides a method of gravel packing a portion of a well bore penetrating a portion of a subterranean formation comprising providing a gravel pack fluid comprising a sintered composite particulate comprising a base material and at least one nanoparticle material; and introducing the gravel pack fluid to the portion of the well bore such that at least a portion of the sintered composite particulates form a gravel pack in or neighboring the portion of the well bore.

Another embodiment of the present invention provides sintered composite particulates useful in completing and stimulating wells comprising a base material and nanoparticle material wherein the composite particulate comprises from about 0.1% to about 30% nanoparticle material by weight of the composite particulate and wherein the composite particulates are sintered.

The features and advantages of the present invention will be readily apparent to those skilled in the art upon a reading of the description of the preferred embodiments that follows.

DESCRIPTION OF PREFERRED EMBODIMENTS

The present invention relates to compositions suitable for use as particulates in subterranean operations, such as proppant or gravel. More particularly, the present invention relates to composite particulates comprising a base material and a nanoparticle material.

The composite particulates of the present invention comprise a base material and a nanoparticle material. The presence of a nanoparticle material in the composite particulate adds, inter alia, strength and crush resistance to the particulate. Further, at least in certain embodiments, the composite particulates may exhibit high temperature and chemical resistance. The composite particulates of the present invention comprise from about 0.1% to about 30% nanoparticle material by weight of the total composite particulate. Preferably, the composite particulates of the present invention comprise from about 1% to about 20% nanoparticle material by weight of the total composite particulate.

In some embodiments of the present invention, the composite particulate optionally may further comprise particles of micro or larger size. In some embodiments of present invention the particles further comprise hollow microspheres that may act to lower the overall density of the particulates. In some embodiments, the presence of the hollow microspheres may be used to reduce the specific gravity of the particulates to the range of from about 0.7 to about 2.2.

Base materials suitable for use in the composite particulates of the present invention may be formed of clay (hydrated aluminum silicate), bauxite (alumina bearing minerals containing 30 to 75% $Al_2O_3$, 9 to 31% $H_2O$, 3 to 25% $FeO_3$, 2 to 9% $SiO_2$ and 1 to 3% $TiO_2$), alumina ($AlO_2$), silica ($SiO_2$), or mixtures thereof. Some preferred mixtures of base materials are routinely used to create sintered particulates suitable for use in subterranean applications and one skilled in the art, with the benefit of this disclosure, will be able to select an appropriate base material for use in a composite particulate of the present invention.

The composite particulates of the present invention also comprise at least one nanoparticle material. For the purposes of this invention, the term "nanoparticle" refers to a particle having an average diameter of less than about 500 nanometers. In some embodiments, the average diameter of a suitable nanoparticle may be less than about 100 nanometers. While the term "diameter" is used herein to describe suitable particle sizes, it should be understood that nanoparticle materials suitable for use in the present invention need mot be spherical in shape. Rather, where an ovoid, fibrous, polygonal, or other shape is used, the definition applied above may be applied such that the average length of the longest line that could theoretically be drawn to bisect the particle is less than about 500 nanometers. Generally speaking, when matter is reduced to a size wherein the average particle diameter is diameter of less than about 500 nanometers, it may exhibit different melting temperatures, magnetization properties, and/or charge capacity as compared to the same matter at a larger size. These and other physical property changes may make nanoparticles particularly well suited for use in forming composite particulates suitable for use in subterranean applications, inter alia, because composite particulates comprising such nanoparticles may be harder and less brittle than composite particulates made of the same materials but using particles of greater than nanoparticle size.

Nanoparticle materials suitable for use in the present invention generally comprise any material that is suitable for adding structural strength to the composite particulate that also has an average diameter of less than about 500 nanometers. Suitable nanoparticles include, but are not limited to, nanoclays, carbon nanofibers, polyhedral oligomeric silsesquioxanes (POSS), carbon nanotubes, nanoparticle minerals (such as silica, alumina, mica, graphite, carbon black, fumed carbon, and fly ash), glass nanospheres, ceramic nanospheres, and combinations thereof.

Carbon black comprises a powdered form of a highly dispersed elemental carbon that may be manufactured by controlled vapor-phase pyrolysis of hydrocarbons. There are a number of different types of carbon black, produced by different industrial processes, including acetylene black, channel black, furnace black, lamp black and thermal black. All are suitable for use in the compositions and methods of the present invention. Average particle diameters in several commercially-produced carbon blacks range from 0.01 to 0.4 micrometers (µm), while average aggregate diameters range from 0.1 to 0.8 µm. Most types of carbon black contain over 97 to 99% elemental carbon. Carbon blacks may also contain chemically bound hydrogen, oxygen, nitrogen and sulfur. Suitable carbon black nanoparticles are commercially available under trade names BLACK PEARLS, ELFTEX, VULCAN, MOGUL, MONARCH, EMPORER, REGAL, UNITED, SPHERON and STERLING, all from Cabot Corp., in Alpharetta, Ga.

Fly ash, as referred to herein, refers to a finely divided residue resulting from the combustion of carbonaceous material, such as ground or powdered coal, and generally carried by generated flue gases. One preferred fly ash is ASTM class F fly ash, having a Blaine fineness of about 10,585 square centimeters per gram and commercially available from Halliburton Energy Services, Inc., of Houston, Tex., under the trade designation "POZMIX®." Another preferred fly ash is ASTM class C high-lime fly ash produced from combustion of low-sulfur, sub-bituminous coal that originated from the Powder River Basin near Gillette, Wyo. Low carbon, high calcium content and self-cementitious properties characterize this fly ash. In other embodiments of the present invention, the combustion product may comprise "bottom ash." Bottom ash, as referred to herein, refers to a finely divided residue resulting from the combustion of carbonaceous material and generally accumulating on the floor of an incinerator.

Polyhedral oligomeric silsesquioxanes (POSS), is a term used in the art to describe the smallest reactive particles of silica. Where a combination of nanoparticles are used to create the nanocomposite particulate, POSS may be used to take advantage of the reactive nature of the silica and allow the resin to more effectively bond to the other nanoparticles used. POSS is particularly advantageous for use in helping a resin bond to a ceramic material.

In certain embodiments, the particulates of the present invention may comprise a filler material in addition to the nanoparticle material and the base material. Suitable filler materials include particles of micro or larger size and may be generally any material that is compatible with the resin, the nanoparticle, and the chosen use for the final particulate. Generally, filler materials are selected to add low cost bulk to the particulate. Some suitable filler materials include metal oxides, fumed silica, microsphere materials, and combinations thereof. In some embodiments of the present method, the filler is present in an amount from about 20% to about 90% by weight of the mixture. In certain exemplary embodiments, the filler material is present in an amount from about 30% to about 60% by weight of the mixture.

A variety of hollow microspheres can be used as a filler material in accordance with this invention including, but not limited to, hollow mineral glass spheres that are commercially available under the tradename "SPHERELITES™" from Halliburton Energy Services of Duncan, Okla.; hollow cenospheres formed of silica and alumina filled with low pressure gases commercially available under the trade designation "CENOLIGHT®" from Microspheres, S. A.; hollow microspheres that are formed of glass and are commercially available under the trade designation "SCOTCHLIGHT™" from the 3M Company of St. Paul, Minn.; and microspheres formed of ceramic material that are commercially available under the trade designation "Z-LIGHT SPHERES™" from the 3M Company of St. Paul, Minn. The crush strengths, true densities and particle sizes of the "SCOTCHLIGHT™" and "Z-LIGHT SPHERES™" hollow microspheres are set forth in the Table 1 below.

TABLE 1

Example Hollow Microsphere Properties

| Hollow Microspheres | Compressive Strength, psi | True Density g/cc | Particle Size, microns |
|---|---|---|---|
| "SCOTCHLIGHT ™" Glass Bubble General Purpose Series[1] | | | |
| K32 | 2,000 | 0.32 | 20 |
| K37 | 3,000 | 0.37 | 20 |
| S38 | 4,000 | 0.38 | 15 |
| K46 | 6,000 | 0.46 | 15 |
| S60 | 10,000 | 0.60 | 10 |
| "SCOTCHLIGHT ™" Glass Bubble Floated Purpose Series[1] | | | |
| H20 | 1,000 | 0.20 | 30 |
| D30 | 4,500 | 0.20 | 20 |
| H50 | 10,000 | 0.20 | 20 |
| "Z-LIGHT SPHERES ™" Ceramic Microspheres[2] | | | |
| G-3125 | 2,000 | 0.7 | 50 |
| G-3150 | 2,000 | 0.7 | 55 |
| G-3500 | 2,000 | 0.7 | 65 |

[1]Commercially available from 3M Company of St. Paul, MN.
[2]Commercially available from 3M Company of St. Paul, MN.

A variety of suitable methods are known for forming particulates from dry ingredients (such as the dry base materials and nanoparticle materials suitable for use in this invention), including spraying, prilling, pelletizing, and other similar procedures. One suitable procedure is as follows. First, a slurry is formed by combining a chosen base material (e.g., in one instance, a mixture of about 60% by weight bauxite and 40% by weight clay) and nanoparticle material with water and a suitable binder. The binder aids the dry materials in forming a particulate. Once the slurry is completely formed the majority of the water is drawn off of the slurry and particulates are formed by, for example, dropping discrete amounts of the mixture onto a rotating table. The particulates are then sintered by heating at a temperature of between about 1000° C. and about 2000° C. The particulates produced generally range in size from about 2 to about 400 on the U.S. Sieve Series, however, it is to be understood that in certain circumstances other sizes may be desired and will be entirely suitable for practice of the present invention. In some embodiments of the present invention, the particulates produced range in size from about 10 to about 70 mesh, U.S. Sieve Series. It is within the ability of one skilled in the art, with the benefit of this disclosure, to select a suitable particulate size.

Where the composite particulates of the present invention further comprise hollow microspheres they are added to the slurry before forming particulates and sintering. Generally, before adding a hollow microspheres to the slurry, the surfaces of the hollow microspheres may be pretreated with a mixture of epoxy and amine organosilane coupling agents to improve the wetability of the hollow microspheres and allow more the microspheres to more readily be mixed with the base material. In addition, the organosilane coupling agents may attach to the surfaces of the hollow microspheres and form silanol thereon that may undergo dehydration to create silicon-oxygen-silicon bonds (Si—O—Si) between the base material and the hollow microspheres. Such bonds may enhance the compressive, tensile, and bond strengths of the solid particles formed.

Suitable organosilane coupling agents include mixtures of epoxy and amine organosilane coupling agents. Examples of such mixtures include 3-glycidoxypropyltrimethoxy silane and 3-aminopropyltriethoxy silane or 3-glycidoxypropyltrimethoxy silane and N-2-(aminoethyl)-3-aminopropyltrimethoxy silane. The surface pretreatment of the hollow microspheres may be carried out by combining the mixture of organosilanes used with ethyl acetate while stirring the ethyl acetate. Thereafter, the hollow microspheres may be added to the mixture and the resulting mixture containing the microspheres is heated at 170° F. for about one hour with continuous stirring, followed by filtration and drying. After drying, the surface treated hollow microspheres are heated to 150° F. in a vacuum oven for 24 hours. Under these conditions, the amino group of the amino organosilane may react with the epoxy group of the epoxy organosilane on the surfaces of the hollow microspheres.

The quantity and size of the hollow microspheres used in the mixture of base material and hollow microspheres may be used, inter alia, to control the specific gravity of the composite particulates formed. Depending on the particular density of the base material and nanoparticle material used, microspheres of the same size or of varying sizes are mixed with the base material to produce light weight high strength particles having specific gravities in the range of from about 0.7 to about 2.2.

The methods of the present invention for treating a subterranean producing zone penetrated by a well bore are basically comprised of the following steps. A treating fluid that comprises a carrier fluid having composite particulates comprising sintered mixtures of a base material and nanoparticle material suspended therein is prepared or provided. Thereafter, the treating fluid is pumped into the subterranean producing zone and the particles are deposited therein.

The treating fluid can be a fracturing fluid whereby the composite particulates are deposited in fractures formed in the subterranean zone, a gravel packing fluid whereby the composite particulates are deposited in the well bore adjacent to the subterranean producing zone, or other similar subterranean treating operation.

A preferred method of the present invention for treating a subterranean producing zone penetrated by a well bore comprises the steps of: (a) preparing or providing a treating fluid that comprises a carrier fluid and composite particulates suspended therein, at least a portion of the composite particulates comprising sintered mixtures of a base material and nanoparticle material; and (b) pumping the treating fluid into the subterranean producing zone whereby the composite particulates are deposited therein.

Thus, the present invention is well adapted to carry out the objects and attain the ends and advantages mentioned as well as those that are inherent therein. While numerous changes may be made by those skilled in the art, such changes are encompassed within the spirit and scope of this invention as defined by the appended claims.

What is claimed is:

1. A method of using a sintered composite particulate in a subterranean application comprising:
   providing a slurry comprising a sintered composite particulate comprising a base material and at least one nanoparticle material; and
   placing the slurry into a well bore penetrating a subterranean formation.

2. The method of claim 1 wherein the sintered composite particulates are of a size in the range of from about 10 to about 70 mesh, U.S. Sieve Series.

3. The method of claim 1 wherein the base material is selected from the group consisting of clay, bauxite, alumina, silica, and mixtures thereof.

4. The method of claim 1 wherein the base material comprises a mixture of clay and bauxite.

5. The method of claim 1 wherein the base material comprises a mixture of clay and alumina.

6. The method of claim 1 wherein the base material comprises a mixture of silica and alumina.

7. The method of claim 1 wherein the base material is present in an amount in the range of from about 50% to about 90% by weight of the sintered composite particulate.

8. The method of claim 1 wherein the sintered composite particulate further comprises a binder.

9. The method of claim 8 wherein the binder is selected from the group consisting of polyvinylacetate, methylcellulose, polymethylmethacrylate, and combinations thereof.

10. The method of claim 1 wherein the sintered composite particulate comprises from about 0.1% to about 30% nanoparticle material by weight of the sintered composite particulate.

11. The method of claim 1 wherein the sintered composite particulate comprises from about 1% to about 20% nanoparticle material by weight of the sintered composite particulate.

12. The method of claim 1 wherein the nanoparticle material is selected from the group consisting of nanoclays. carbon nanofibers, polyhedral oligomeric silsesquioxane (POSS), carbon nanotubes, nanoparticle minerals, nanoparticle silica, nanoparticle alumina, nanoparticle mica, nanoparticle graphite, nanoparticle carbon black, nanoparticle fumed carbon, nanoparticle fly ash, glass nanospheres, ceramic nanospheres, and combinations thereof.

13. The method of claim 1 wherein the sintered composite particulate further comprises a filler material.

14. The method of claim 13 wherein the sintered composite particulate comprises from about 20% to about 90% filler material by weight.

15. The method of claim 13 wherein the filler material is selected from the group consisting of metal oxides, fumed silica, and combinations thereof.

16. The method of claim 13 wherein the filler material comprises hollow microspheres.

17. The method of claim 16 wherein the hollow microsphere is formed from glass or a ceramic material.

18. The method of claim 16 wherein the sintered composite particulate has a specific gravity in the range of from about 0.7 to about 2.2.

19. The method of claim 16 wherein the hollow microspheres are of a size in the range of from about 5 microns to about 65 microns.

20. The method of claim 16 wherein the sintered composite particulate comprises from about 10% to about 50% hollow microspheres by weight of the sintered composite particulate.

21. A method of fracturing a portion of a subterranean formation having at least one fracture therein comprising:
   providing a fracturing fluid comprising a sintered composite particulate comprising a base material and at least one nanoparticle material; and
   placing the fracturing fluid into a well bore penetrating the portion of the subterranean formation such that at least a portion of the sintered composite particulates enter at least one fracture therein.

22. The method of claim 21 wherein the sintered composite particulates are of a size in the range of from about 10 to about 70 mesh, U.S. Sieve Series.

23. The method of claim 21 wherein the base material is selected from the group consisting of clay, bauxite, alumina, silica, and mixtures thereof.

24. The method of claim 21 wherein the base material is present in an amount in the range of from about 50% to about 90% by weight of the sintered composite particulate.

25. The method of claim 21 wherein the sintered composite particulate further comprises a binder that is selected from the group consisting of polyvinylacetate, methylcellulose, polymethylmethacrylate, and combinations thereof.

26. The method of claim 21 wherein the sintered composite particulate comprises from about 0.1% to about 30% nanoparticle material by weight of the sintered composite particulate.

27. The method of claim 21 wherein the nanoparticle material is selected from the group consisting of nanoclays, carbon nanofibers, polyhedral oligomeric silsesquioxane (POSS), carbon nanotubes, nanoparticle minerals, nanoparticle silica, nanoparticle alumina, nanoparticle mica, nanoparticle graphite, nanoparticle carbon black, nanoparticle fumed carbon, nanoparticle fly ash, glass nanospheres, ceramic nanospheres, and combinations thereof.

28. The method of claim 21 wherein the sintered composite particulate further comprises a filler material.

29. The method of claim 28 wherein the sintered composite particulate comprises from about 20% to about 90% filler material by weight of the sintered composite particulate.

30. The method of claim 28 wherein the filler material is selected from the gxoup consisting of metal oxides, fumed silica, and combinations thereof.

31. The method of claim 21 wherein the filler material comprises hollow microspheres.

32. The method of claim 31 wherein the hollow microsphere is formed from glass or a ceramic material.

33. The method of claim 31 wherein the sintered composite particulate has a specific gravity in the range of from about 0.7 to about 2.2.

34. The method of claim 31 wherein the hollow microspheres are of a size in the range of from about 5 microns to about 65 microns.

35. The method of claim 31 wherein the sintered composite particulate comprises from about 10% to about 50% hollow microspheres by weight of the sintered composite particulate.

36. A method of gravel packing a portion of a well bore penetrating a portion of a subterranean formation comprising:
    providing a gravel pack fluid comprising a sintered composite particulate comprising a base material and at least one nanoparticle material; and
    introducing the gravel pack fluid to the portion of the well bore such that at least a portion of the sintered composite particulates form a gravel pack in or neighboring the portion of the well bore.

37. The method of claim 36 wherein the sintered composite particulates are of a size in the range of from about 10 to about 70 mesh, U.S. Sieve Series.

38. The method of claim 36 wherein the base material is selected from the group consisting of clay, bauxite, alumina, silica, and mixtures thereof.

39. The method of claim 36 wherein the base material is present in an amount in the range of from about 50% to about 90% by weight of the sintered composite particulate.

40. The method of claim 36 wherein the sintered composite particulate further comprises a binder that is selected from the group consisting of polyvinylacetate, methylcellulose, polymethylmethacrylate, and combinations thereof.

41. The method of claim 36 wherein the sintered composite particulate comprises from about 0.1% to about 30% nanoparticle material by weight of the sintered composite particulate.

42. The method of claim 36 wherein the nanoparticle material is selected from the group consisting of nanoclays, carbon nanofibers, polyhedral oligomeric silsesquioxane (POSS), carbon nanotubes, nanoparticle minerals, nanoparticle silica, nanoparticle alumina, nanoparticle mica, nanoparticle graphite, nanoparticle carbon black, nanoparticle fumed carbon, nanoparticle fly ash, glass nanospheres, ceramic nanospheres, and combinations thereof.

43. The method of claim 36 wherein the sintered composite particulate further comprises a filler material.

44. The method of claim 43 wherein the sintered composite particulate comprises from about 20% to about 90% filler material by weight of the sintered composite particulate.

45. The method of claim 43 wherein the filler material is selected from the group consisting of metal oxides, fumed silica, and combinations thereof.

46. The method of claim 43 wherein the filler material comprises hollow microspheres.

47. The method of claim 46 wherein the hollow microsphere is formed from glass or a ceramic material.

48. The method of claim 46 wherein the sintered composite particulate has a specific gravity in the range of from about 0.7 to about 2.2.

49. The method of claim 46 wherein the hollow microspheres are of a size in the range of from about 5 microns to about 65 microns.

50. The method of claim 46 wherein the sintered composite particulate comprises from about 10% to about 50% hollow microspheres by weight of the sintered composite particulate.

* * * * *